United States Patent
Nammi

(10) Patent No.: US 12,267,898 B2
(45) Date of Patent: Apr. 1, 2025

(54) LOCATION BASED CORESET CONFIGURATION FOR TRANSMITTING THE PHYSICAL DOWNLINK CONTROL CHANNEL IN 5G WIRELESS COMMUNICATION SYSTEMS

(71) Applicant: AT&T Intellectual Property I, L.P., Atlanta, GA (US)

(72) Inventor: SaiRamesh Nammi, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 476 days.

(21) Appl. No.: 17/387,384

(22) Filed: Jul. 28, 2021

(65) Prior Publication Data

US 2021/0360720 A1  Nov. 18, 2021

Related U.S. Application Data

(63) Continuation of application No. 16/277,602, filed on Feb. 15, 2019, now Pat. No. 11,109,432.

(51) Int. Cl.
| | |
|---|---|
| *H04W 76/15* | (2018.01) |
| *H04W 64/00* | (2009.01) |
| *H04W 84/04* | (2009.01) |

(52) U.S. Cl.
CPC ......... *H04W 76/15* (2018.02); *H04W 64/006* (2013.01); *H04W 84/042* (2013.01)

(58) Field of Classification Search
CPC .. H04W 76/15; H04W 64/006; H04W 84/042
See application file for complete search history.

(56) References Cited

U.S. PATENT DOCUMENTS

| 10,477,491 B2 | 11/2019 | Mueck et al. |
| 2011/0044193 A1 | 2/2011 | Forenza et al. |

(Continued)

FOREIGN PATENT DOCUMENTS

| CN | 109152050 A | * | 1/2019 | ............... H04L 1/00 |
| CN | 113475033 A | | 10/2021 | |

(Continued)

OTHER PUBLICATIONS

Non-Final Office Action received for U.S. Appl. No. 16/277,602 dated Jun. 26, 2020, 20 pages.

(Continued)

*Primary Examiner* — Rhonda L Murphy
(74) *Attorney, Agent, or Firm* — Guntin & Gust, PLC; Kenneth S. Kwan

(57) ABSTRACT

The disclosed subject matter relates to techniques for determining an appropriate aggregation level for a control channel resource set (CORESET). In one embodiment, a method is provided that comprises determining, by a first device operatively coupled to a processor, an aggregation level for application by a second device to decode candidate downlink control channels associated with a CORESET. The method further comprises transmitting, by the first device, aggregation level information to the second device indicating the aggregation level. As a result of the transmitting, the second device becomes configured to apply the aggregation level in association with attempting to decode the candidate control downlink control channels. In various embodiments, the aggregation level is determined based one or more criteria, including an aggregation level capability of the second device, a location of the second device relative to the first device, and a geometry associated with the second device.

20 Claims, 11 Drawing Sheets

(56) References Cited

U.S. PATENT DOCUMENTS

| | | | |
|---|---|---|---|
| 2011/0105162 | A1 | 5/2011 | Kim et al. |
| 2014/0328235 | A1 | 11/2014 | Merlin et al. |
| 2018/0206266 | A1* | 7/2018 | Byun .................... H04W 72/20 |
| 2018/0242296 | A1 | 8/2018 | Li et al. |
| 2019/0334687 | A1 | 10/2019 | Su et al. |
| 2019/0357189 | A1* | 11/2019 | Xue ........................ H04W 8/24 |
| 2020/0187236 | A1 | 6/2020 | Moon et al. |
| 2023/0188163 | A9* | 6/2023 | Xu .................... H03M 13/2906 |
| | | | 714/776 |

FOREIGN PATENT DOCUMENTS

| | | | |
|---|---|---|---|
| JP | 2007-535854 | A | 12/2007 |
| JP | 2013-543348 | A | 11/2013 |
| JP | 2015-513341 | A | 5/2015 |
| JP | 2016-521077 | A | 7/2016 |
| WO | 2012/057484 | A2 | 5/2012 |
| WO | 2013/115708 | A2 | 8/2013 |
| WO | 2018/043600 | A1 | 3/2018 |
| WO | 2018/128468 | A1 | 7/2018 |
| WO | 2018/137242 | A1 | 8/2018 |
| WO | 2018/141246 | A1 | 8/2018 |
| WO | 2018/228530 | A1 | 12/2018 |

OTHER PUBLICATIONS

International Search Report and Written Opinion received for PCT Application Serial No. PCT/US2020/016251 dated May 8, 2020, 14 pages.
Final Office Action received for U.S. Appl. No. 16/277,602 dated Jan. 11, 2021, 42 pages.
Examination report received for Indian Patent Application Serial No. 202147036078 dated Dec. 8, 2022, 7 pages.
Office Action received for Japanese Patent Application Serial No. 2021-547356 dated Oct. 13, 2022, 16 pages.
International Preliminary Report on Patentability received for PCT Application Serial No. PCT/US2020/016251 dated Aug. 26, 2021, 9 pages.
Office Action received for Chinese Patent Application Serial No. 202080014173.2 dated Oct. 12, 2021, 2 pages.
Office Action received for Indian Patent Application Serial No. 202147036078 dated Aug. 20, 2021, 1 page.
Communication pursuant to Rules 161(1) and 162 EPC received for EP Patent Application Serial No. 20708991.3 dated Sep. 22, 2021, 3 pages.
U.S. Appl. No. 16/277,602, filed Feb. 15, 2019.

* cited by examiner

LOCATION BASED CORESET CONFIGURATION FOR TRANSMITTING THE PHYSICAL DOWNLINK CONTROL CHANNEL IN 5G WIRELESS COMMUNICATION SYSTEMS

RELATED APPLICATION

The subject patent application is a continuation of, and claims priority to, U.S. patent application Ser. No. 16/277,602, filed Feb. 15, 2019, and entitled "LOCATION BASED CORESET CONFIGURATION FOR TRANSMITTING THE PHYSICAL DOWNLINK CONTROL CHANNEL IN 5G WIRELESS COMMUNICATION SYSTEMS," the entirety of which application is hereby incorporated by reference herein.

TECHNICAL FIELD

The disclosed subject matter relates wireless communication systems and more particularly, to techniques for determining an appropriate aggregation level for transmitting the physical downlink control channel (PDCCH) associated with a control channel resource set (CORESET) in New Radio (NR) access communication systems.

BACKGROUND

To meet the huge demand for data centric applications, Third Generation Partnership Project (3GPP) systems and systems that employ one or more aspects of the specifications of the Fourth Generation (4G) standard for wireless communications are being extended to a Fifth Generation (5G) standard for wireless communications, also referred to as New Radio (NR) access. Compared to existing 4G technologies, 5G is targeting much higher throughput with low latency and utilizing higher carrier frequencies and wider bandwidths, at the same time reducing energy consumption and costs. 5G networks are also expected to offer system access and services that have different characteristics and connectivity control for future services. In this regard, the NR design needs to be highly flexible and tailored towards new requirements.

DETAILED DESCRIPTION

Figure 1:
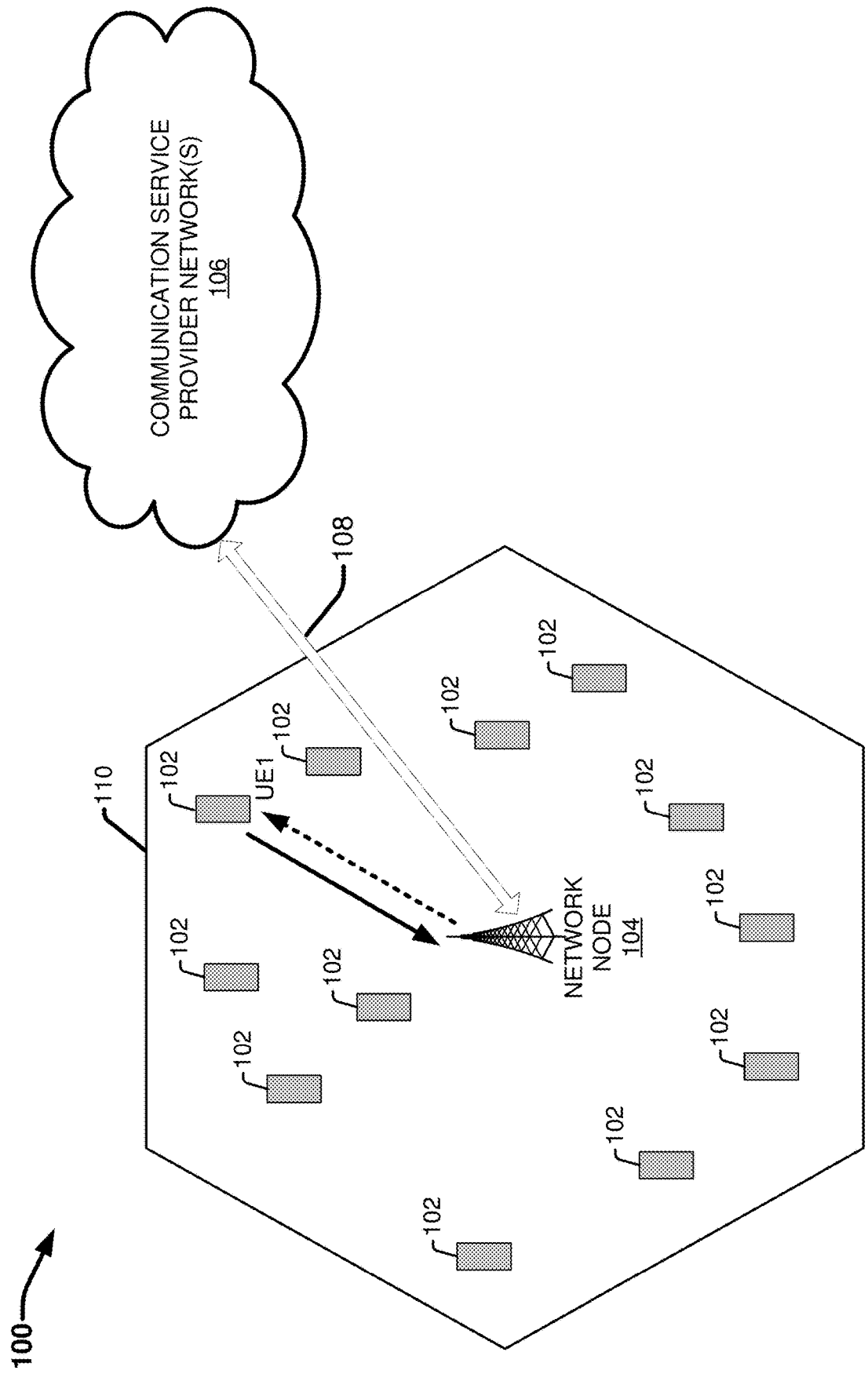
FIG. 1 is an illustration of an example wireless communication system that facilitates location-based CORESET configuration for transmitting the PDCCH in accordance with various aspects and embodiments of the subject disclosure.

The following detailed description is merely illustrative and is not intended to limit embodiments and/or application or uses of embodiments. Furthermore, there is no intention to be bound by any expressed or implied information presented in the preceding sections or in the Detailed Description section.

In many wireless communication systems including 5G NR wireless communication systems, the physical downlink control channel (PDCCH) is used to carry and provide downlink control information (DCI) to the UE, such as information regarding the downlink scheduling assignments and the uplink scheduling grants. For example, with respect to multiple-input/multiple-output (MIMO) systems, the DCI typically includes the number of MIMO layers scheduled, transport block sizes, modulation for each codeword, parameters related to hybrid automatic repeat requests (HARQ), sub-band locations, and the like. However, the specific contents of the PDCCH can vary based on transmission mode and DCI format.

Legacy long-term evolution (LTE) control channels are distributed across the entire system bandwidth, making it difficult to control intercell interference. However, NR PDCCHs are specifically designed to transmit in a configurable control channel resource set (CORESET). A CORESET is a time-frequency resource allocation for a UE within which the UE can receive candidate PDCCHs. A CORESET is analogous to the control region in LTE but is generalized in the sense that the set of resource blocks (RBs) and the set of orthogonal frequency division multiplex (OFDM) symbols in which it is located are configurable with the corresponding PDCCH search spaces. Such configuration flexibilities of control regions including time, frequency, numerologies, and operating points enable NR to address a wide range of use cases.

For example, the size and location of a CORESET can be configured by the network and thus can be set smaller than the carrier bandwidth. The first CORESET, (referred to as CORESET0) is provided by the master information block (MIB) as part of the configuration of the initial bandwidth part and enables the UE to receive the remaining system information and additional configuration information from the network. After connection setup, the UE can be configured with multiple, potentially overlapping, CORESETs using radio resource control (RRC) signaling protocol. In accordance with existing NR standards, in the time domain, a CORESET can be up to 3 OFDM symbols in duration and located anywhere within the time slot. Existing NR standards further define a CORESET in the frequency domain using multiples of 6 resource blocks up to the carrier bandwidth. Frequency allocation in a CORESET configuration can be continuous or non-continuous.

A PDCCH is confined to one CORESET and transmitted with its own demodulation reference signal (DMRS) enabling UE-specific beamforming of the control channel. In accordance with existing NR standards, a PDCCH encoded using an aggregation level selected from level a set of five possible aggregation levels referred to as level-1, level-2, level-4, level-8 and level-16. These respective aggregation levels correspond to different control channel resource elements (CCEs) that can carry the PDCCH, (e.g. level-1 corresponds to 1 CCE, level-2 corresponds to 2 CCEs, level-4 corresponds to 4 CCEs and so on). In this regard, the UE needs to decode each PDCCH using its corresponding aggregation level (e.g., either level-1, level-2, level-4, level-8, or level-16). The different aggregation levels (or CCE allocations) for the PDCCH are used to accommodate different DCI payload sizes or different coding rates (also referred to as different DCI formats) for the PDCCH. For example, NR currently defines four different DCI sizes/coding rates (or formats). One size/coding rate is used for the fall back DCI, a second size/coding rate is for scheduling downlink grants, a third size/coding rate is for scheduling uplink grants and a fourth size/coding rate is used for slot format indication and pre-emption indication depending on the configuration.

In accordance with initial NR standards, the UEs are required to blindly monitor a number of PDCCH candidates of different DCI formats and different aggregation levels. In this regard, for each CORESET assigned to the UE, the UE is required to blindly decode every possible DCI size/format (e.g., which currently include four) and using every possible aggregation level (e.g., which currently include five). Thus, the number of each decoding options for each CORESET is twenty, and the UE can be configured with multiple CORESETS (e.g., currently up to four different CORESETS). Thus, the complexity cost associated with this blind decoding processing is extensive and not scalable to an increasing number of PDCCH sizes/formats and aggregation level combinations.

To limit the UE side complexity in searching/decoding all configured CORESETs using every different aggregation level, etc., some NR protocols have been proposed that define NR a confined set of search spaces for the UE to search and decode. The search space can be characterizes as set of candidate control channels formed by a CORESET at a given aggregation level which the UE is supposed to attempt to decode. As there are multiple CORESETs, there are multiple search spaces. Some NR protocols have proposed to restrict the number of search spaces to ten or lease for each UE. In accordance with restricted search space techniques, the network needs to indicate to the UE the defined search space and the corresponding aggregation level. With these techniques, to further reduce the complexity associated with search spaces involving many possible aggregation levels, the common practice is to configure the aggregation level for a given CORESET to a constant value. However, using a fixed value for the aggregation level for a given CORESET is not efficient for 5G systems as it results in using unnecessary resources for PDCCH, thereby reducing the available resources for physical downlink shared channel (PDSCH) and consequently reducing the link and system throughout.

The disclosed subject matter provides an efficient solution for reducing the PDCCH search space complexity while optimizing link and system through by tailoring the aggregation level for each UE assigned CORESET based on UE specific criteria. In various embodiments, the network node can determine the appropriate aggregation level for a given UE configured CORESET based on one or more criteria including but not limited to, a known aggregation level capability of the UE, a location of the UE within the cell (e.g., distance from the UE to the network node), and/or a geometry of the UE. The network node can further provide the UE with information indicating the determined aggregation level for a given CORESET in the UE specific search space. For example, in various embodiments, the network node can employ higher layer signaling (e.g., radio resource control (RRC) signaling and/or media access control (MAC) signaling) to instruct the UE regarding the determined aggregation level for a given CORESET configured for the UE. The UE can further be configured to apply the aggregation level in association with attempting to decode the PDCCH candidates corresponding to the given CORESET, thereby reducing the number of blind decoding attempts while optimizing the amount of PDCCH resources used based on the capability and/or context (e.g., needs) of the UE. In this regard, the because disclosed techniques are efficient in terms of time/frequency resources, the resources required for transmitting the downlink control channel (e.g., the PDCCH) can be minimized, thereby increasing the amount of available resources for data transmission. Hence, with increased data transmission resources, the link and system throughput are improved significantly.

In accordance with one or more embodiments, a first device (e.g., a gNodeB or the like) is provided that comprises a processor and a memory that stores executable instructions that, when executed by the processor, facilitate performance of operations. These operations can comprise determining an aggregation level for application by a second device (e.g., a UE) to decode candidate downlink control channels associated with a CORESET. The operations further comprise sending aggregation level information to the second device indicating the aggregation level. Based on the sending, the second device is configured to apply the aggregation level in association with attempting to decode the candidate control downlink control channels. In one or more implementations, the sending the aggregation level information comprises employing a signaling protocol classified as a higher layer signaling protocol.

In some implementations, the determining the aggregation level comprises selecting the aggregation level from a group of candidate aggregation levels based on a defined criterion. For example, in one implementation, the aggregation level can be determined based on capability information indicating one or more aggregation levels supported by the second device. In another implementation, the aggregation level can be determined based on a location of the second device. In another implementation, the aggregation level can be determined based on a distance between the second device and the first device. For example, with this implementation, the determining the aggregation level can comprise selecting a first aggregation level based on the distance being less than a defined distance and selecting a second aggregation level based on the distance being greater than the defined distance, and wherein the first aggregation level is lower than the second aggregation level. In another implementation, the aggregation level can be determined based on a geometry associated with the second device. For example, with this implementation, the determining the aggregation level can comprise selecting a first aggregation level based on the geometry being less than a defined value and selecting a second aggregation level based on the geometry being greater than the defined value, and wherein the first aggregation level is higher than the second aggregation level.

In various additional embodiments, wherein the determining the aggregation level comprises selecting the aggregation level from a group of candidate aggregation levels based on a combination of criteria selected from a group of criteria consisting of: a first criterion applicable to an aggregation level capability of the second device, a second criterion applicable to a location of the second device relative to the first device, and a third criterion applicable to a geometry associated with the second device.

In accordance with one or more embodiments, a first device (e.g., a UE or the like) is provided that comprises a processor and a memory that stores executable instructions that, when executed by the processor, facilitate performance of operations. These operations can comprise receiving aggregation level information from a second device (e.g., a gNodeB) indicating an aggregation level for a CORESET, wherein the aggregation level was selected by the second device from candidate aggregation levels based on a defined criterion. The operations further comprise, based on the receiving, employing the aggregation level in association with attempting to decode candidate downlink control channels associated with the CORESET. For example, the defined criterion can be evaluated with respect to a group of device criteria consisting of: an aggregation level capability of the first device, a location of the first device relative to the second device, and a geometry associated with the first device. In some implementations, the aggregation level information comprises first aggregation level information, the aggregation level comprises a first aggregation level, and wherein the operations further comprise receiving second aggregation level information from the second device indicating a second aggregation level for the CORESET, wherein the second aggregation level was selected by the second device from the candidate aggregation levels based on a change to the defined criterion. The operations further comprise based on the receiving, employing the second aggregation level instead of the first aggregation level in association with the attempting to decode the candidate downlink control channels.

In some embodiments, elements described in connection with the disclosed systems can be embodied in different forms such as a computer-implemented method, a computer-readable or machine-readable storage medium, or another form.

The subject disclosure is now described with reference to the drawings, wherein like reference numerals are used to refer to like elements throughout. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the provided drawings. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure. The terms scheme, protocol, configuration and the like, are used interchangeably throughout the specification in various contexts to refer to a defined manner for formatting, transmitting or receiving information.

FIG. 1 is an illustration of an example wireless communication system 100 that facilitates location-based CORESET configuration for transmitting the PDCCH in accordance with various aspects and embodiments of the subject disclosure. System 100 can comprise a plurality of UEs 102 and a radio network node 104. The non-limiting term user equipment (UE) is used herein to refer to any type of wireless device that can communicate with a radio network node in a cellular or mobile communication system. Some examples UEs can include but are not limited to, a target device, a device to device (D2D) UE, a machine type UE or UE capable of machine to machine (M2M) communication, a portable digital assistant (PDA), a tablet personal computer (PC), a mobile terminal, a smart phone, a laptop, a laptop embedded equipped (LEE), a laptop mounted equipment (LME), USB dongles, a wearable device, a virtual reality (VR) device, a heads-up display (HUD) device, a smart car, and the like. In one or more embodiments, the respective UEs 102 (and network node 104) can include two or more antennas (not shown) thereby supporting multiple-input and multiple output (MIMO) communications in association 5G NR communication schemes with phase tracking. The number of antennas provided on a UE 102 can vary (e.g., from two to hundreds or more to accommodate massive MIMO systems). In this regard, in accordance with various embodiments, wireless communication system 100 can be or include a MIMO system. MIMO systems can significantly increase the data carrying capacity of wireless systems. For these reasons, MIMO is an integral part of the 3GPP and 4GPP generation wireless systems. Wireless communication system 100 can further support the massive MIMO communication protocols introduced by 5G NR that employ hundreds of antennas at the transmitter side and receiver side.

In this regard, various embodiments are applicable to single carrier as well as to multicarrier (MC) or carrier aggregation (CA) operation of the UE in conjunction with MIMO in which the UE is able to receive and/or transmit data to more than one serving cells using MIMO. However, the various techniques described herein are not limited to use in MIMO systems and can be applied to other wireless communication systems (e.g., uplink and side link systems). The term carrier aggregation (CA) is also called (e.g. interchangeably called) "multi-carrier system", "multi-cell operation", "multi-carrier operation", "multi-carrier" transmission and/or reception. It is noted that the solutions outlined equally applies for Multi RAB (radio bearers) on some carriers (that is data plus speech is simultaneously scheduled). Similarly, the solutions are applicable where some UEs 102 are scheduled using eMBB, some UEs 102 are scheduled using URLLC, and some UEs 102 are using mMTC applications.

In the embodiment shown, system 100 is or includes a wireless communication network serviced by one or more wireless communication network providers. The UEs 102 can be communicatively coupled to the wireless communication network via the network node 104. In this regard, a UE 102 can send and/or receive communication data via a wireless link or channels to the network node 104. For example, the dashed arrow lines from the network node 104 to example UE1 represent downlink communications and the solid arrow lines represent uplink communications. It should be appreciated that these arrow lines are merely provided to demonstrate wireless communication links between a UE and the network node 104. In this regard, although arrowed lines are not drawn for every depicted UE 102, it should be appreciated that all depicted UEs can wirelessly communicate with the network node 104 using uplink and downlink communications.

The non-limiting term network node (or radio network node) is used herein to refer to any type of network node serving a UE 102 and/or connected to another network node, network element, or another network node from which the UE 102 can receive a radio signal. Examples of network nodes (e.g., network node 104) can include but are not limited to: a base station (BS) device, a Node B device, a multi-standard radio (MSR) device (e.g., an MSR BS), a gNodeB device, an eNode B device, a network controller device, a radio network controller (RNC) device, a base station controller (BSC) device, a relay device, a donor node device controlling relay, a base transceiver station (BTS) device, an access point (AP) device, a transmission point device, a transmission node, an RRU device, an RRH device, node devices in distributed antenna system (DAS), and the like. In accordance one or more embodiment, the network node 104 can include two or more antennas to support various MIMO and/or massive MIMO communications in association phase tracking.

System 100 can further include one or more communication service provider networks 106 that facilitate providing wireless communication services to various UEs, including UE 102, via the network node 104 and/or various additional network devices (not shown) included in the one or more communication service provider networks 106. In the embodiment shown, the area defined by the hexagon indicates a single wireless network cell 110 serviced by the network node 104. It should be appreciated however that system 100 can include a plurality of cells respectively serviced by network nodes that are respectively communicatively coupled to the one or more communication service provider networks 106. In this regard, the one or more communication service provider networks 106 can include various types of disparate networks, including but not limited to: cellular networks, femto networks, picocell networks, microcell networks, internet protocol (IP) networks Wi-Fi service networks, broadband service network, enterprise networks, cloud-based networks, and the like. For example, in at least one implementation, system 100 can be or include a large-scale wireless communication network that spans various geographic areas. According to this implementation, the one or more communication service provider networks 106 can be or include the wireless communication network and/or various additional devices and components of the wireless communication network (e.g., additional network devices and cell, additional UEs, network server devices, etc.). The network node 104 can be connected to the one or more communication service provider networks 106 via one or more backhaul links 108. For example, the one or more backhaul links 108 can include wired link components, such as but not limited to: like a T1/E1 phone line, a digital subscriber line (DSL) (e.g., either synchronous or asynchronous), an asymmetric DSL (ADSL), an optical fiber backbone, a coaxial cable, and the like. The one or more backhaul links 108 can also include wireless link components, such as but not limited to, line-of-sight (LOS) or non-LOS links which can include terrestrial air-interfaces or deep space links (e.g., satellite communication links for navigation).

Although the subject disclosure is directed to systems employing 5G or NR communications technologies, it should be appreciated that system 100 can employ various wireless communication technologies to facilitate wireless radio communications between devices (e.g., the UE 102 and the network node 104). In this regard, the disclosed techniques for CSI estimation in association with PTRS integration can be applied to any RAT or multi-RAT system where the UE operates using multiple carriers, such as but not limited to: long term evolution (LTE), frequency division duplex (FDD), time division duplex (TDD), FDD/TDD, wideband code division multiple access (WCMDA), high speed packet access (HSPA), WCMDA/HSPA, global system for mobile communication (GSM), 3GGP, GSM/3GGP, Wi Fi, WLAN, WiMax, CDMA2000, and the like.

As discussed above, in NR communication systems such as system 100, the network node 104 communicates DCI to the UE 102 using one of several possible configurable PDCCHs. For example, each CORESET can hold several different PDDCHs of various DCI sizes/formats and a UE 102 can be configured with a plurality of CORESETs (e.g., one to four according to current 5G specifications). In addition, each candidate PDCCH can be encoded using one of several possible aggregation levels (e.g., level-1, level-2, level-4, level-8 and level-16). In order to restrict the UE 102 from searching through all CORSESTs configured for UE for the many candidate PDCCHs and attempting to decode each candidate PDCCH using every possible aggregation level (e.g., 1, 2, 4, 6, 8 or 18), NR protocols have defined restricted search spaces for the UE. A single search space indicates the possible candidate PDCCHs which the UE should attempt to decode within the one or more CORESETs assigned to the UE 102 and using a single aggregation level. In order to further reduce the complexity associated with the number of candidate PDCCHs and corresponding UE decoding attempts, NR protocols have resorted to configuring the aggregation level for a given CORESET to a constant value. This means that that the network node 104 would apply the same aggregation level for each PDCCH of each CORESET for all the UEs 102 in the cell 110, significantly overutilizing unnecessary resources in many scenarios, such as scenarios in which lower aggregation levels could be used without scarifying performance quality.

System 100 provides a much more efficient solution for reducing the PDCCH search space complexity while optimizing link and system through by tailoring the aggregation level for each UE assigned CORESET based on UE 102 specific criteria. In particular, instead of applying the same aggregation level for respective CORESETs used by all UEs 102 in the cell 110, in accordance with the disclosed techniques, the network node 104 can tailor the aggregation level for a given CORESET assigned to the UE 102 (e.g., by the network node 104) based on one or more UE specific criteria. For example, in some embodiments, the network node 104 can select an appropriate aggregation level for encoding the PDCCH from a defined set of possible aggregation levels based on one or more UE specific criteria. For instance, the defined set of aggregation levels can include NR aggregation level-1, level-2, level-4, level-8 and level-16. In other embodiments, the network node 104 can determine a new, UE specific aggregation level (e.g., an aggregation level between or beyond aggregation level-1, level-2, level-4, level-8 and level-16) for encoding the PDCCH for a given UE 102 and assigned CORESET based on the one or more UE specific criteria.

The UE specific criteria can include predefined performance criteria. In various embodiments, the UE specific criteria can include one, or a combination of two or more, of the following: a known aggregation level capability of the UE 102, a location of the UE 102 within the cell (e.g., a distance from the UE 102 to the network node 104), and/or a geometry of the UE. For example, in various implementations, a UE 102 may not be capable of supporting all possible aggregation levels.

For instance, a UE may support only one or a subset of the possible aggregation levels (e.g., one or a subset of aggregation levels included in a group comprising level-1, level-2, level-4, level-8 and level 16). For example, some UEs 102 may support only lower level aggregation levels 1, 2 and 4, while other may support only higher aggregation levels 8 and 16. Thus, in one or more embodiments, the network node 104 can receive UE aggregation level capability information from a UE 102 indicating the one or more aggregation levels supported by the UE. For example, the UE 102 can be configured to provide the UE aggregation level capability information at the time of initial link set-up, registration of the UE with the network provider, or in another suitable manner. In other implementations, the network node 104 can look up UE aggregation level capability in a network accessible database based on known information about the UE (e.g., a type of the UE, a unique identifier for the UE, or the like). Regardless of the manner in which the network node 104 obtains aggregation level capability information for a UE 102, the network node 104 can employ the UE aggregation level capability information to restrict the possible aggregation levels for using for the PDCCH based on those which the UE is capable of supporting. In some implementations in which the UE capability is unknown or cannot be determined, the network node 104 can apply a default aggregation level capability restriction. For example, the default aggregation level capability restriction can include a predefined subset (e.g., one or more) of the possible aggregation levels. For instance, if the UE capability is unknown or cannot be determined, the network node 104 can assume the UE is capable of supporting a default aggregation level (e.g., level-8) or a subset of default aggregation levels (e.g., level-4 and level-8).

Selection of the aggregation level based on UE location is rooted in the observed correlation between UE location within the cell, signal-to-noise ratio (SNR) and block error rate (BLER) at different aggregation levels. In particular, SNR generally increases as the UE 102 moves closer to the network node 104 and decreases as the UE moves away from the network node. For example, lower SNR is more frequently observed at the cell 110 edge while higher SNR is more frequently observed at the cell 110 centre.

Figure 2:
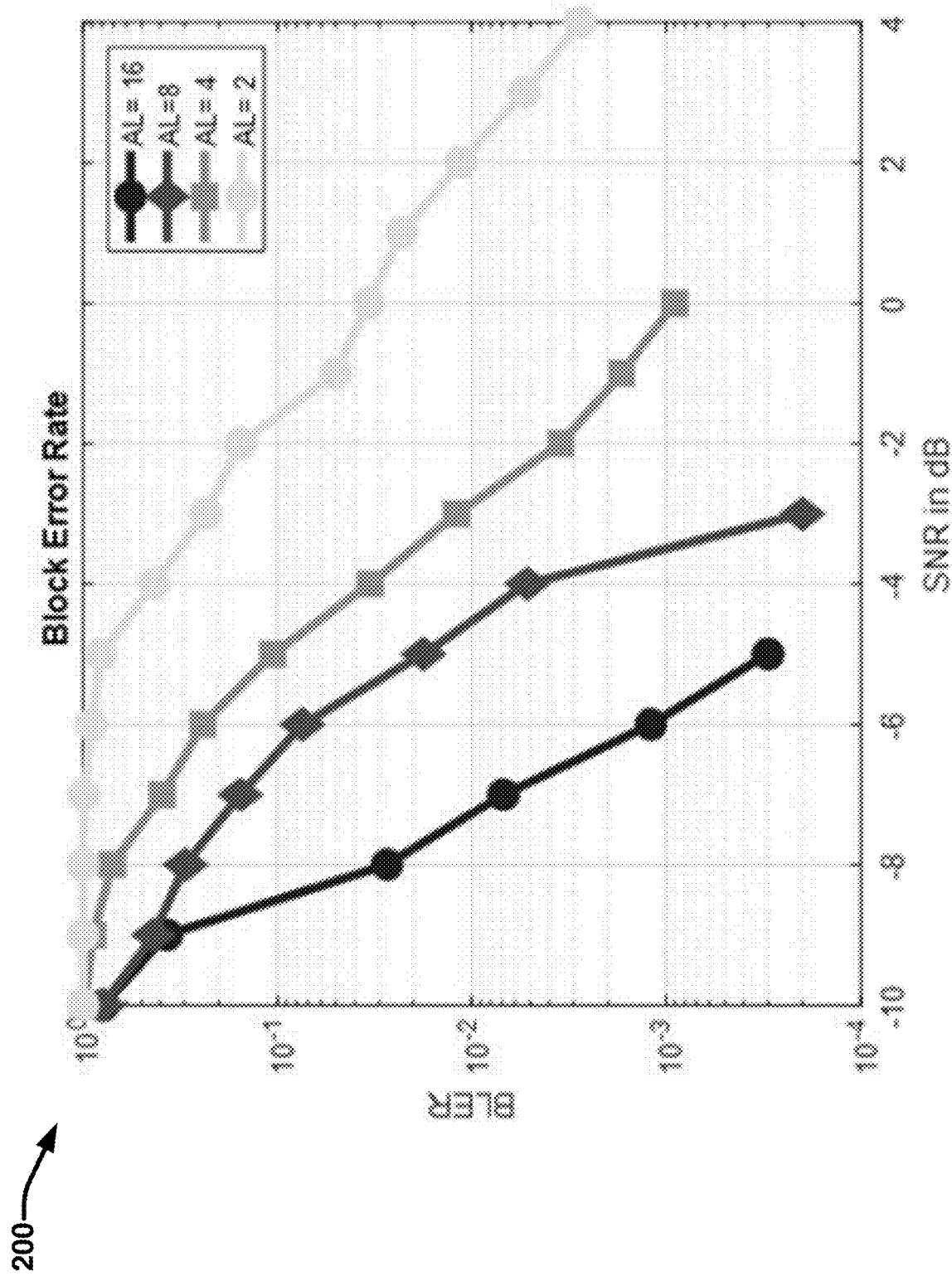
FIG. 2 presents graph illustrating the block error rate (BLER) for different aggregation levels as a function signal-to-noise ratio (SNR) in accordance with various aspects and embodiments of the subject disclosure.

FIG. 2 presents graph 200 illustrating the block error rate (BLER) for different aggregation levels as a function signal-to-noise ratio (SNR) in accordance with various aspects and embodiments of the subject disclosure. As shown in graph 200, the BLER performance depends on the aggregation level and the specific SNR. In this regard, for all aggregation levels, the BLER decreases as the SNR increases. However, the lower aggregation levels (e.g., AL-2 and AL-4) provide sufficiently low BLER (e.g., good performance) at higher SNR levels. Thus, low aggregation levels (e.g., AL-1, AL-2, and AL-4), can provide good BLER performance in scenarios when the SNR is high. On the other hand, when SNR is low higher aggregation levels (e.g., AL-8 and AL-16) can be used to achieve good BLER performance.

Thus, in various embodiments, the network node 104 can be configured to determine/select the appropriate aggregation level based on the distance between the UE 102 and the network node, wherein the closer the UE 102 to the network node 104 lower the SNR and thus the lower the aggregation level. For example, when the UE 102 is nearer to the network node 104, the network node 104 can configure the UE to use a lower aggregation level (e.g., AL-1, AL-2 or AL-4). This is because at the cell centre the UE generally have a high SNR. Similarly, when the UE 102 is at the cell edge, the network node 104 can configure the UE to use a higher aggregation level (e.g., AL-8 or AL-16). In various embodiments the network node 104 can employ predefined distance ranges or thresholds for determining the appropriate aggregation level. For example, at a distance less than "n" meters between the UE 102 and the network node, the network node can apply a first aggregation level (e.g., AL-1), at a distance greater than "n" meters and less than "m" meters the network node can apply a second aggregation level higher than the first aggregation level (e.g., AL-2), at a distance greater than "m" meters and less than "p" meters the network node can apply a third aggregation level higher than the second aggregation level (e.g., AL-4), and so on.

In other embodiments in which the network node 104 receives and/or determines information regarding the SNR experienced by the UE, the network node 104 can determine the aggregation level based on the SNR, wherein lower aggregation levels are used for high SNRs and higher aggregation levels are used for low SNR. For example, with these embodiments, the network node 104 can apply similar SNR thresholds and/or ranges assigned to different aggregation levels. For example, the network node 104 can employ defined aggregation level to SNR level criteria such as: SNRs less than "x" can be assigned a first aggregation level (e.g., AL-16); SNRs greater than "x" can be assigned a second aggregation level less than the first aggregation level (e.g., AL-8), and so on.

The UE geometry criterion can also be employed by the network node 104 (in addition to and/or alternative to the location criterion) to determine an appropriate aggregation level to direct the UE to apply in association with decoding candidate PDCCHs for a given CORESET. The geometry of the UE can be determined as a function of the signal-to-interference plus noise ratio (SINR) and/or the CQI reported by the UE 102. For example, in some implementations, the UE geometry can be determined by the network node (and/or the UE and reported by the UE), by averaging the SINR for example uplink channel estimates. In other implementations, the UE geometry can be determined by averaging the CQI reported by the UE. With respect to UE geometry, the network node 104 can assign higher aggregation levels to lower UE geometries (e.g., lower SINR) and lower aggregation levels to higher UE geometries (e.g., higher SNR). For example, the network node 104 can employ defined aggregation level to UE geometry criteria such as: geometries less than "y" can be assigned a first aggregation level (e.g., AL-8); geometries greater than "y" can be assigned a second aggregation level lower than the first aggregation level (e.g., AL-4), and so on.

In some embodiments, the network node 104 can employ one of the above noted criterion to determine the appropriate aggregation level for application by the UE in association with decoding candidate PDCCHs for a given CORESET. In other embodiments, the network node can employ a combination of two or more of the above noted criterion. In some embodiments in which the UE is configured with more than one CORESET, the network node 104 can determine or select a single aggregation level for all of the CORESETs. In other embodiments, the network node 104 can determine or select a different aggregation level for two or more of the CORESETs. In this regard, the network node 104 can tailor the aggregation level for each CORESET based on the UE specific criteria. As a result, in some implementation, two or more CORESETS assigned to the UE can receive different aggregation level assignments.

The network node 104 can further encode the PDCCH with the determined or selected aggregation level for the CORESET in which the PDCCH is provided. In addition, the network node 104 can instruct the UE 102 to apply only the determined or selected aggregation level in association with decoding the candidate PDCCHs for the corresponding CORESET. In this regard, the network node 104 can inform the UE regarding the selected/determined aggregation level for a given CORESET. Based on reception of information identifying the selected/determined aggregation level for a given CORESET, the UE 102 can further be configured to apply the selected/determined aggregation level in association with attempting to decode the candidate PDCCHs corresponding to the given CORESET. In various embodiments, the network node 104 can employ higher layer signalling (e.g., radio resource control (RRC) signalling and/or media access control (MAC) signalling) to instruct the UE regarding the determined aggregation level for a given CORESET configured for the UE.

With the disclosed techniques for selecting/determining the PDCCH aggregation level by the network node 104 for a CORESET assigned/configured for a UE 102 based on a known capability, location, and/or geometry of the UE 102, and instructing the UE 102 to apply only the selected/determined aggregation level to decode the candidate PDCCHs associated with that CORESET, the number of blind decoding attempts required by the UE is significantly reduced. In addition, the time and frequency resources used for the PDCCHs for the collective UEs in the cell 110 are efficiently distributed base on UE capability and/or (e.g., needs) of the UE. As a result, the amount of available resources for data transmission are increased, thereby enhancing link and system throughput.

Figure 3:
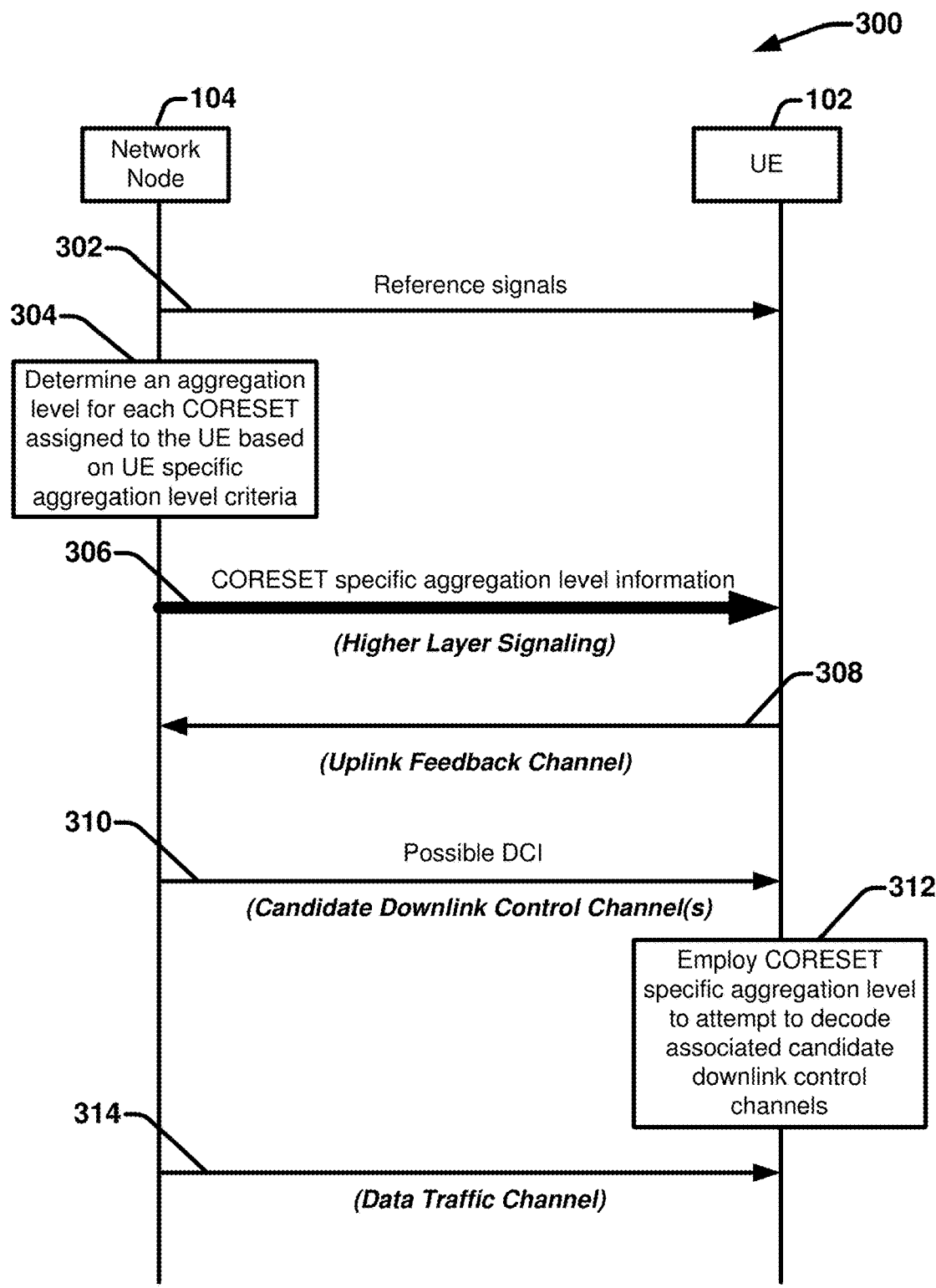
FIG. 3 presents a signaling diagram of an example message sequence for tailoring the PDCCH aggregation level for a user equipment (UE) specific CORESET in accordance with various aspects and embodiments of the subject disclosure.

FIG. 3 presents a signaling diagram of an example message sequence 300 for tailoring the PDCCH aggregation level for a UE specific CORESET in accordance with various aspects and embodiments of the subject disclosure. Message sequence 300 particularly exemplifies a process for downlink data transfer in 5G/NR systems. Message sequence 300 involves determining an aggregation level for a UE (e.g., UE 102) by the network node (e.g., network node 104), and communicating the aggregation level to the UE. Message sequence 300 also exemplifies the UE side response based on reception of the aggregation level. Repetitive description of like elements employed in respective embodiments is omitted for sake of brevity.

At 302, the network node 104 can send cell specific/UE specific reference signals in accordance with standard downlink data transfer initiation. From the pilot or reference signals, the UE computes the channel estimates and the computes the parameters needed for channel state information (CSI) reporting. The UE 102 can further send the CSI report to the network node 104 via an uplink feedback channel, either on request from the network or periodically. The network scheduler uses the CSI information in choosing the parameters for scheduling of the UE. The network node 104 sends the scheduling parameters to the UE as DCI in the downlink control channel (e.g., the PDCCH). After that the actual data transfer can take place from the network node 104 to the UE.

In accordance with 5G/NR signalling, the DCI can be encoded in one of a plurality of possible PDCCHs respectively associated with one or more CORESETs assigned to the UE 102. In this regard, the CORESET is defined from the UE perspective and only indicates where (e.g., search spaces) the UE 102 may receive PDCCH transmissions. The CORESET configuration information assigned to the UE by the network node 104 does not provide the UE with confirmation that the network node 104 will be or has transmitted a PDCCH to the UE. In addition, at no point does the network node 104 provide the UE 102 with information indicating where/how the PDCCH while be specifically configured if and when it is sent (e.g., the specific CORESET where it will be if more than one CORESET is assigned to the UE, the specific DCI size/format, the specific time/frequency resources that will be used, the specific numerology that will be used, etc.).

However, with the disclosed signalling techniques, at 304, the network node 104 can determine an aggregation level (for encoding/decoding the PDCCH) for each CORESET assigned to the UE based on UE specific aggregation level criteria. For example, the network node 104 can determine or select the most appropriate aggregation level (e.g., AL-1, AL-2, AL-4, AL-8 or AL-16) for encoding/decoding the PDCCH based on one or more of: a known aggregation level supported by the UE, a location of the UE relative to the network node 104, a SNR reported by the UE in association with reception of signals (e.g., reference signals) from the network node 104, and a geometry of the UE. For example, in some implementations, if the UE is configured with a plurality of CORESETs, the network node 104 can determine different aggregation levels for the UE to use for two or more of the different CORESETs. In other implementations, if the UE is configured with a plurality of CORESETs, the network node 104 can determine a single aggregation level for the UE to apply to all of the CORESETs.

At 306, the network node 104 can send the UE CORESET specific aggregation level information indicating the selected/determined aggregation level for each CORESET. In various embodiments, the network node 104 can send the aggregation level information to the UE using higher layer signalling (e.g., an RRC signalling protocol and/or a MAC signalling protocol). At 308, the UE can send the network node 104 with feedback (e.g., CSI feedback) via an uplink feedback channel. At 310, the network node may send the UE with possible DCI via a PDCCH from among a plurality of candidate downlink control channels. At 312, the UE can employ the CORESET specific aggregation level to attempt to decode the associated candidate downlink control channels. If the UE receives and successfully decodes the PDCCH, at 314, the UE can then receive data via the data traffic channel.

Figure 4:
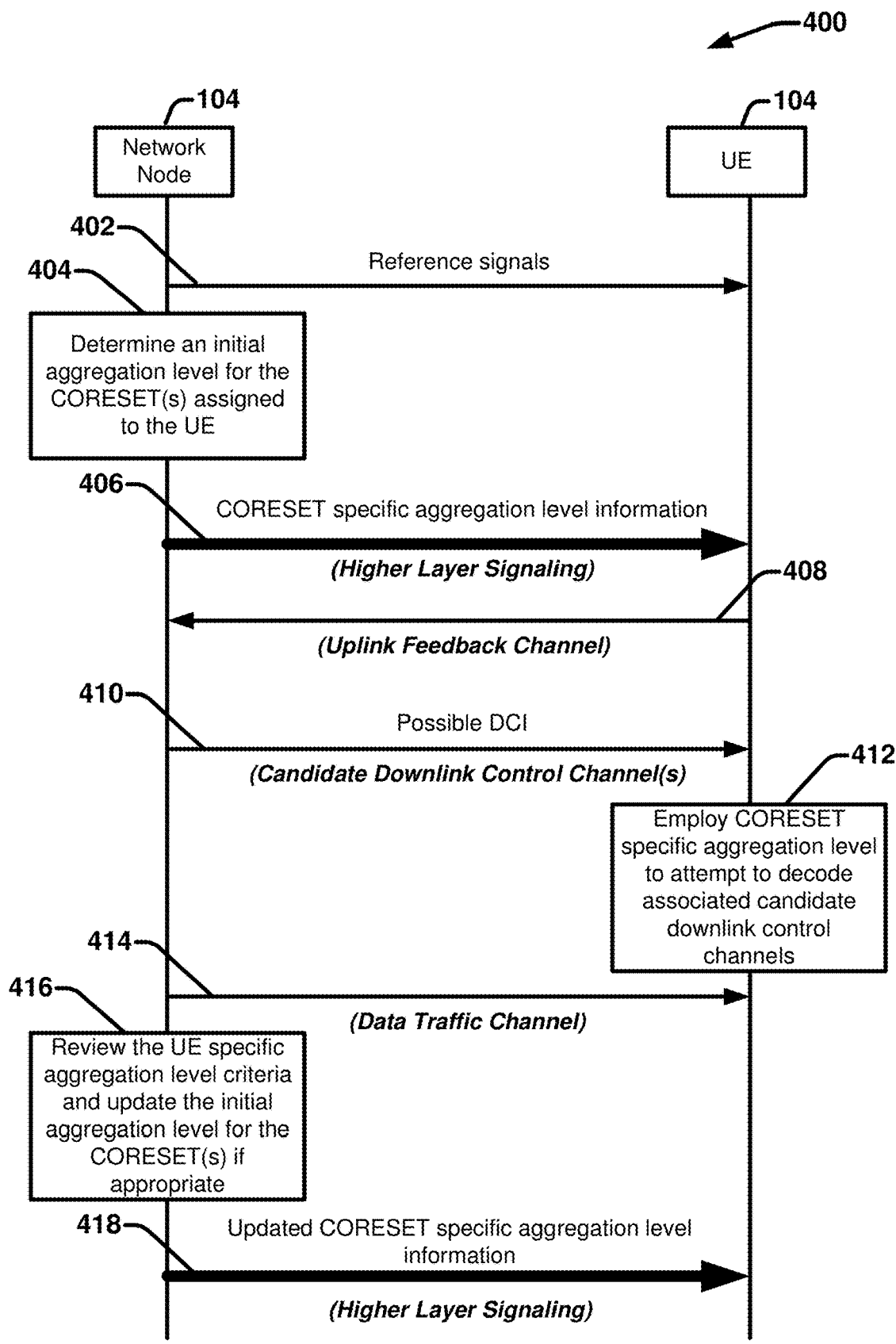
FIG. 4 presents a signaling diagram of an example message sequence for tailoring the PDCCH aggregation level for a UE specific CORESET in accordance with various aspects and embodiments of the subject disclosure.

FIG. 4 presents a signaling diagram of another example message sequence 400 for tailoring the PDCCH aggregation level for a UE specific CORESET in accordance with various aspects and embodiments of the subject disclosure. Message sequence 400 also exemplifies a process for downlink data transfer in 5G/NR systems. Message sequence 400 involves determining an aggregation level for a UE (e.g., UE 102) by the network node (e.g., network node 104), and communicating the aggregation level to the UE. Message sequence 400 also exemplifies the UE side response based on reception of the aggregation level. Message sequence 400 is similar or substantially similar with addition of a few notable variations. Repetitive description of like elements employed in respective embodiments is omitted for sake of brevity.

Similar to messaging sequence 400, at 402, the network node 104 can send cell specific/UE specific reference signals in accordance with standard downlink data transfer initiation. At 404, the network node 104 can determine an aggregation level (for encoding/decoding the PDCCH) for the CORESET (or CORESETs) assigned to the UE. In some implementations, at 404, the network node 104 can determine the initial aggregation level based on UE specific aggregation level criteria. For example, the network node 104 can determine or select the most appropriate aggregation level (e.g., AL-1, AL-2, AL-4, AL-8 or AL-16) for encoding/decoding the PDCCH based on one or more of: a known aggregation level supported by the UE, a location of the UE relative to the network node 104, a SNR reported by the UE in association with reception of signals (e.g., reference signals) from the network node 104, and a geometry of the UE. In other implementations, at 404 the network node can apply a default aggregation level (e.g., a pre-set aggregation level not specific to the UE) for application by the UE to decode all candidate PDCCHs. In either of these implementations, if the UE is configured with a plurality of CORESETs, the network node 104 can determine a single or different aggregation levels for the UE to use for two or more of the different CORESETs.

At 406, the network node 104 can send the UE CORESET specific aggregation level information indicating the selected/determined aggregation level for each CORESET. In various embodiments, the network node 104 can send the aggregation level information to the UE 102 using higher layer signalling (e.g., an RRC signalling protocol and/or a MAC signalling protocol). At 408, the UE can send the network node 104 with feedback (e.g., CSI feedback) via an uplink feedback channel. At 410, the network node may send the UE with possible DCI via a PDCCH from among a plurality of candidate downlink control channels. At 412, the UE 102 can employ the CORESET specific aggregation level to attempt to decode the associated candidate downlink control channels. If the UE receives and successfully decodes the PDCCH, at 414, the UE can then receive data via the data traffic channel.

At 416, the network node 104 can review the UE specific aggregation level criteria and update the initial aggregation level for the CORESET (or CORESETs) assigned to the UE if appropriate. For example, the network node 104 can be configured to periodically check the selection criteria for the aggregation level and determine if based on the selection criteria that, the initial configured aggregation level should be changed. In this regard, at 416, the network node 104 can determine if the initial aggregation level is appropriate based on a known aggregation level supported by the UE, a location of the UE relative to the network node 104, a SNR reported by the UE in association with reception of signals (e.g., reference signals) from the network node 104, and a geometry of the UE. For example, if the selection criterion was not initially reviewed at 404 (e.g., a default aggregation level was applied), the network node 104 can now apply the selection criteria at 416 to determine whether the initial aggregation level satisfies the selection criteria. In another implementation, if the selection criterion was applied at 404, but the UE location has now changed, the reported SNR has changed and/or the UE geometry has changed, the initial aggregation level may no longer be the most appropriate aggregation level. Accordingly, at 416, the network node 104 can determine if the initial aggregation level is appropriate for the current UE specific performance parameters (e.g., if the initial aggregation level is appropriate based on the current UE location/geometry). If the network node determines a different aggregation level is more appropriate based on the current UE specific performance parameters, then the network node 104 can determine an updated aggregation level based on the current UE specific performance parameters. Then at 418 the network node 404 can send the UE 102 the updated CORESET specific aggregation level information (e.g., using higher layer signalling), and the UE 102 can begin to use the updated aggregation level instead of the initial aggregation level to decode the candidate PDCCHs.

Figure 5:
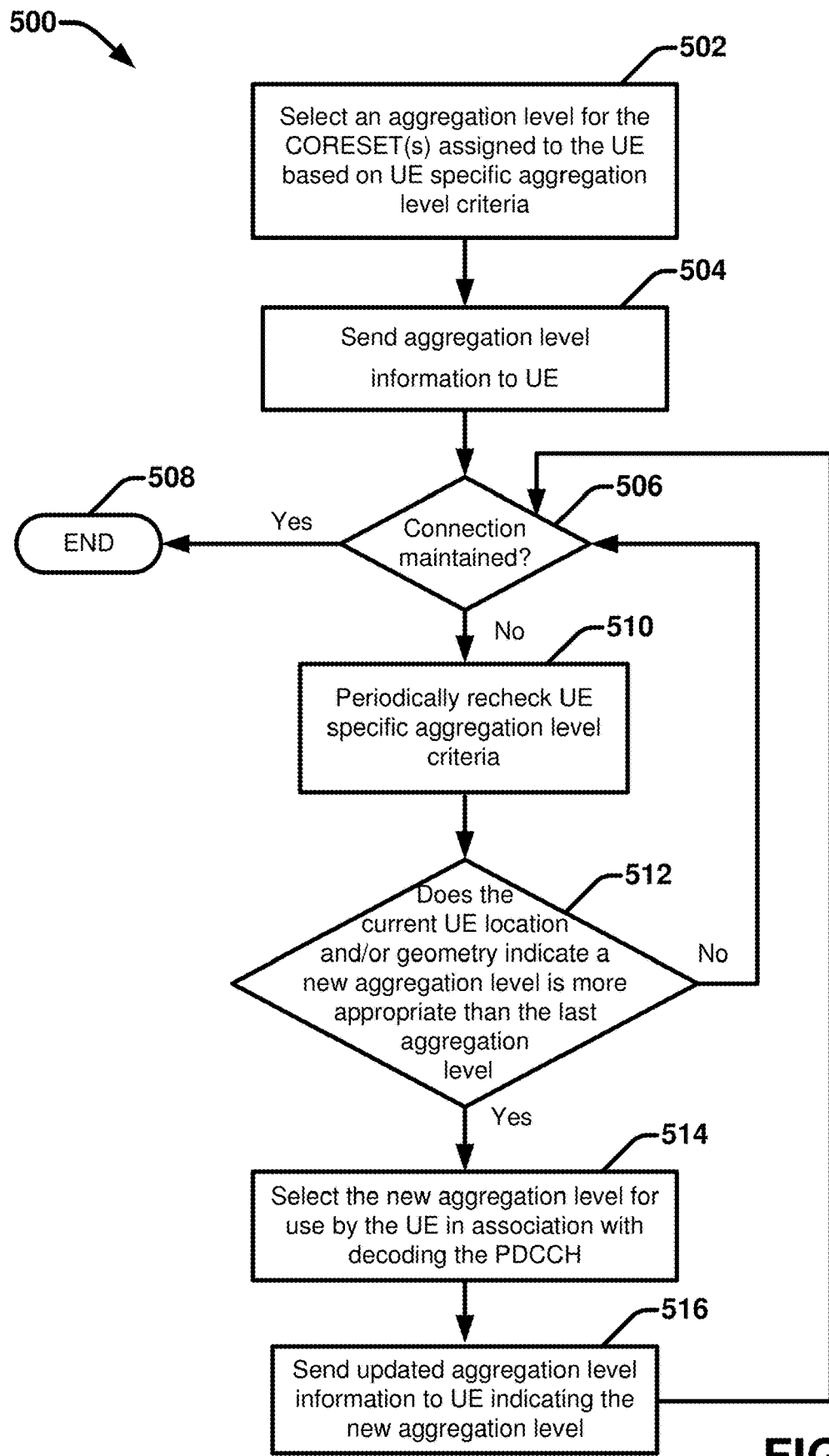
FIG. 5 presents a flow diagram of an example method for tailoring the PDCCH aggregation level for a UE specific CORESET in accordance with various aspects and embodiments of the subject disclosure.

FIG. 5 presents a flow diagram of an example method 500 for tailoring the PDCCH aggregation level for a UE specific CORESET in accordance with various aspects and embodiments of the subject disclosure. Repetitive description of like elements employed in respective embodiments is omitted for sake of brevity.

At 502, the network node 104 can select an aggregation level for the CORESET (or CORESETs) assigned to the UE based on UE specific aggregation level criteria (e.g., capability, location, geometry, etc.). At 504, the network node 104 can send aggregation level information to the UE indicating the selected aggregation level. At 506, the network node can determine if the connection/link between the UE and the network node is maintained. If not, then method 500 can end. However, if the connection is maintained, at 510 the network node can periodically recheck the UE specific aggregation level criteria. At 512, the network node can determine if the current UE location and/or geometry indicates a new aggregation level is more appropriate than the last aggregation level. If not, then method 500 can proceed back to 506 can continue accordingly. However, if at 512 the network node determines that the current UE location and/or geometry indicates a new aggregation level is more appropriate than the last aggregation level, then at 514 the network node can select the new aggregation level for use by the UE in association with decoding the PDCCH. At 516, the network node can send updated aggregation level information to the UE indicating the new aggregation level. Method 500 can further continue from 506 until the connection is no longer maintained.

Figure 6:
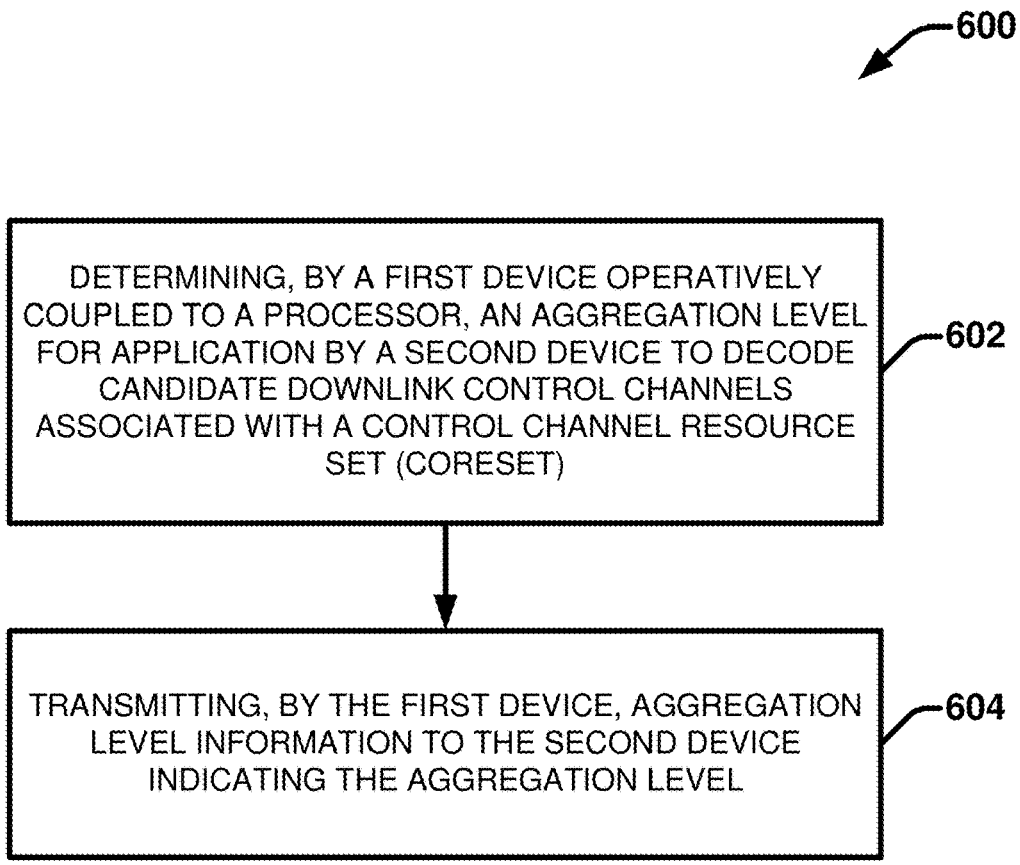
FIG. 6 presents a high-level flow diagram of an example method for tailoring the PDCCH aggregation level for a UE specific CORESET in accordance with various aspects and embodiments of the subject disclosure.

FIG. 6 presents a high-level flow diagram of an example method 600 for tailoring the PDCCH aggregation level for a UE specific CORESET in accordance with various aspects and embodiments of the subject disclosure. Method 600 provides an exemplary method for performance by a network node (e.g., network node 104) of a wireless communication network 100 in association serving a UE of the wireless communication network. Repetitive description of like elements employed in respective embodiments is omitted for sake of brevity.

At 602, a first device operatively coupled to a processor (e.g., network node 104), determines an aggregation level for application by a second device (e.g., UE 102) to decode candidate downlink control channels associated with a CORESET. At 604, the first device transmits aggregation level information to the second device indicating the aggregation level. In various embodiments, based on the transmitting, the second device employs the aggregation level in association with attempting to decode the candidate downlink control channels.

Figure 7:
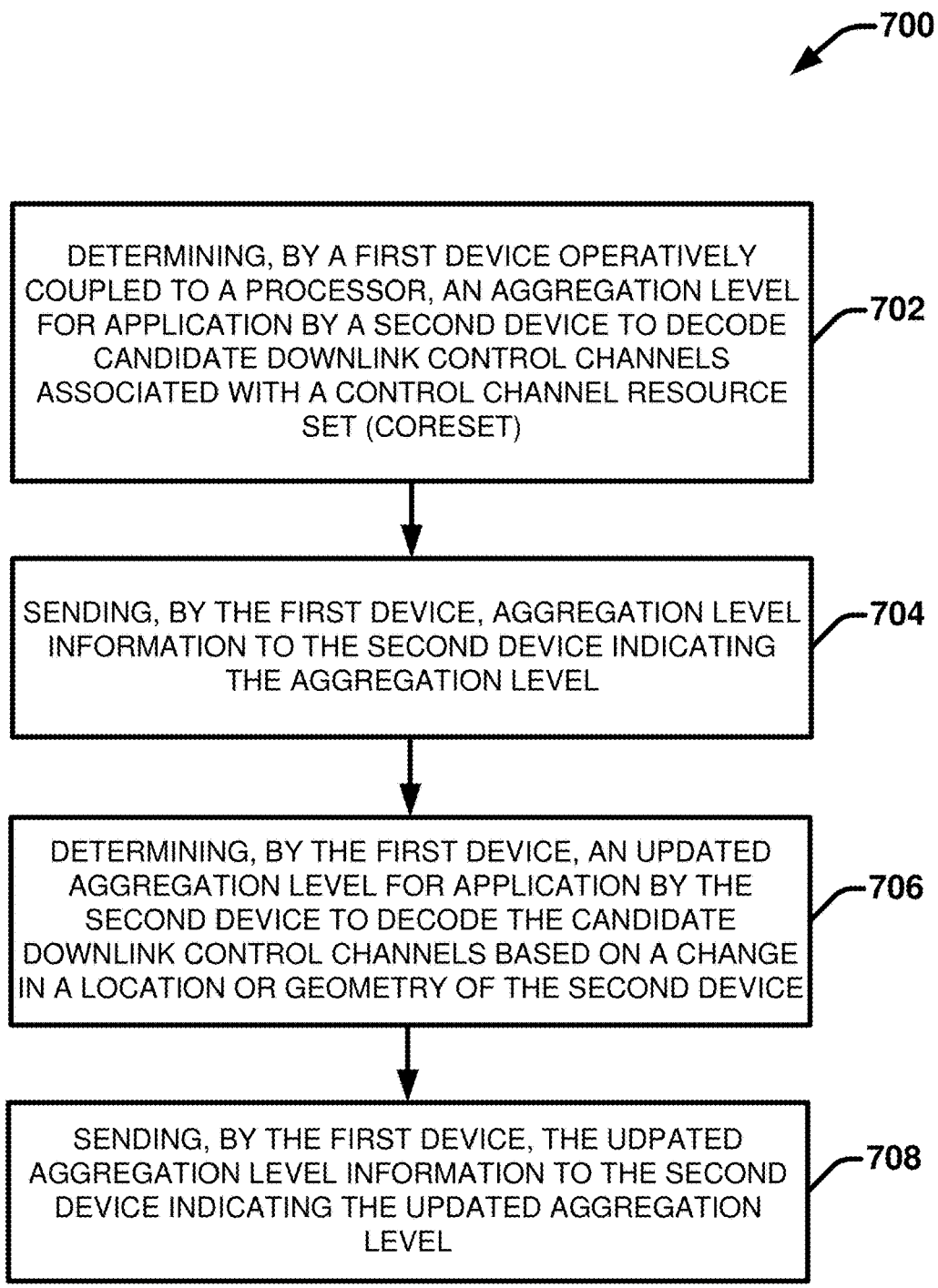
FIG. 7 presents a high-level flow diagram of another example method for tailoring the PDCCH aggregation level for a UE specific CORESET in accordance with various aspects and embodiments of the subject disclosure.

FIG. 7 presents a high-level flow diagram of another example method 700 for tailoring the PDCCH aggregation level for a UE specific CORESET in accordance with various aspects and embodiments of the subject disclosure. Method 700 also provides an exemplary method for performance by a network node (e.g., network node 104) of a wireless communication network 100 in association serving a UE of the wireless communication network. Repetitive description of like elements employed in respective embodiments is omitted for sake of brevity.

At 702, a first device operatively coupled to a processor (e.g., network node 104), determines an aggregation level for application by a second device (e.g., UE 102) to decode candidate downlink control channels associated with a CORESET. At 704, the first device sends aggregation level information to the second device indicating the aggregation level. In various embodiments, based on the sending, the second device employs the aggregation level in association with attempting to decode the candidate downlink control channels. At 706, the first device determines an updated aggregation level for application by the second device to decode the candidate downlink control channels based on a change in allocation or geometry of the second device. At 708, the first device sends updated aggregation level information to the second device indicating the updated aggregation level. In various embodiments, based on the sending the second device employs the updated aggregation level instead of the aggregation level in association with the attempting to decode the candidate downlink control channels.

Figure 8:
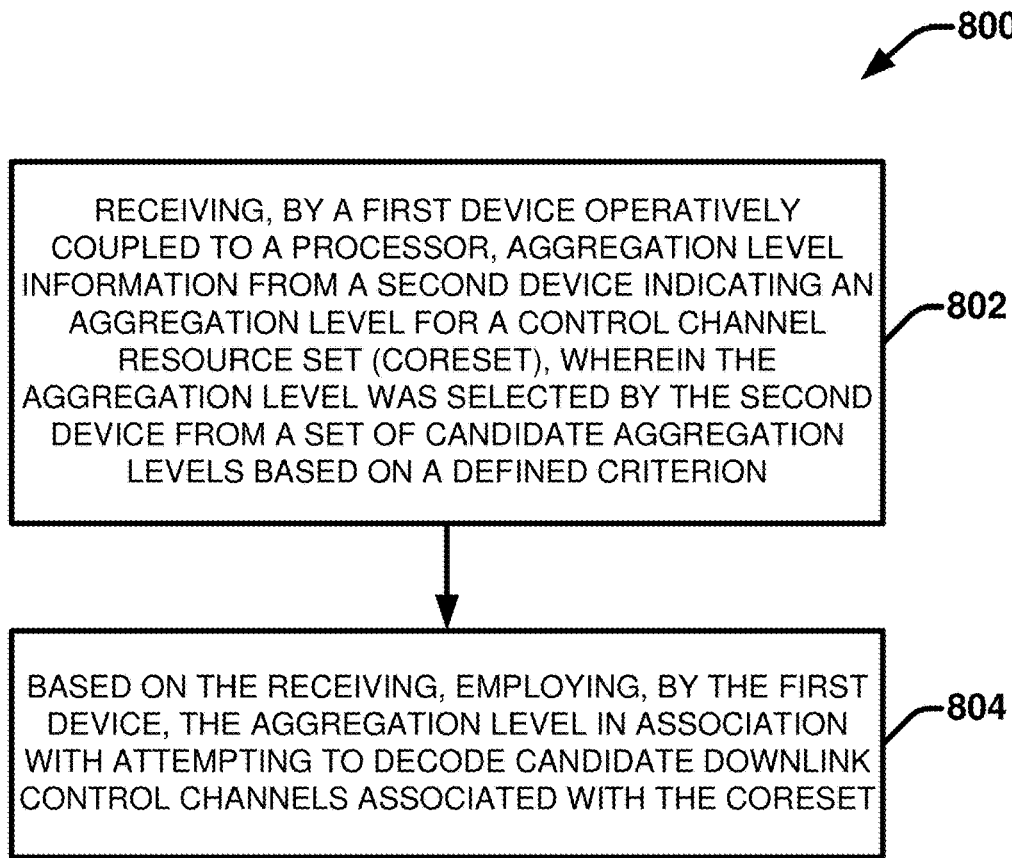
FIG. 8 presents a high-level flow diagram of an example method for receiving and applying a UE specific aggregation level for decoding candidate PDCCHs associated with a CORESET in accordance with various aspects and embodiments of the subject disclosure.

FIG. 8 presents a high-level flow diagram of an example method 800 for receiving and applying a UE specific aggregation level for decoding candidate PDCCHs associated with a CORESET in accordance with various aspects and embodiments of the subject disclosure. Method 800 provides an exemplary method for performance by a UE (e.g., UE 102) of a wireless communication network 100 in association communication with a network node (e.g., network node 104) servicing a cell in which the UE is located. Repetitive description of like elements employed in respective embodiments is omitted for sake of brevity.

At 802, a first device operatively coupled to a processor (e.g., UE 102), receives aggregation level information from a second device (e.g., network node 104) indicating an aggregation level for a CORESET, wherein the aggregation level was selected by the second device from candidate aggregation levels based on a defined criterion. At 804, based on the receiving, the first device employs the aggregation level in association with attempting to decode candidate downlink control channels associated with the CORESET.

Figure 9:
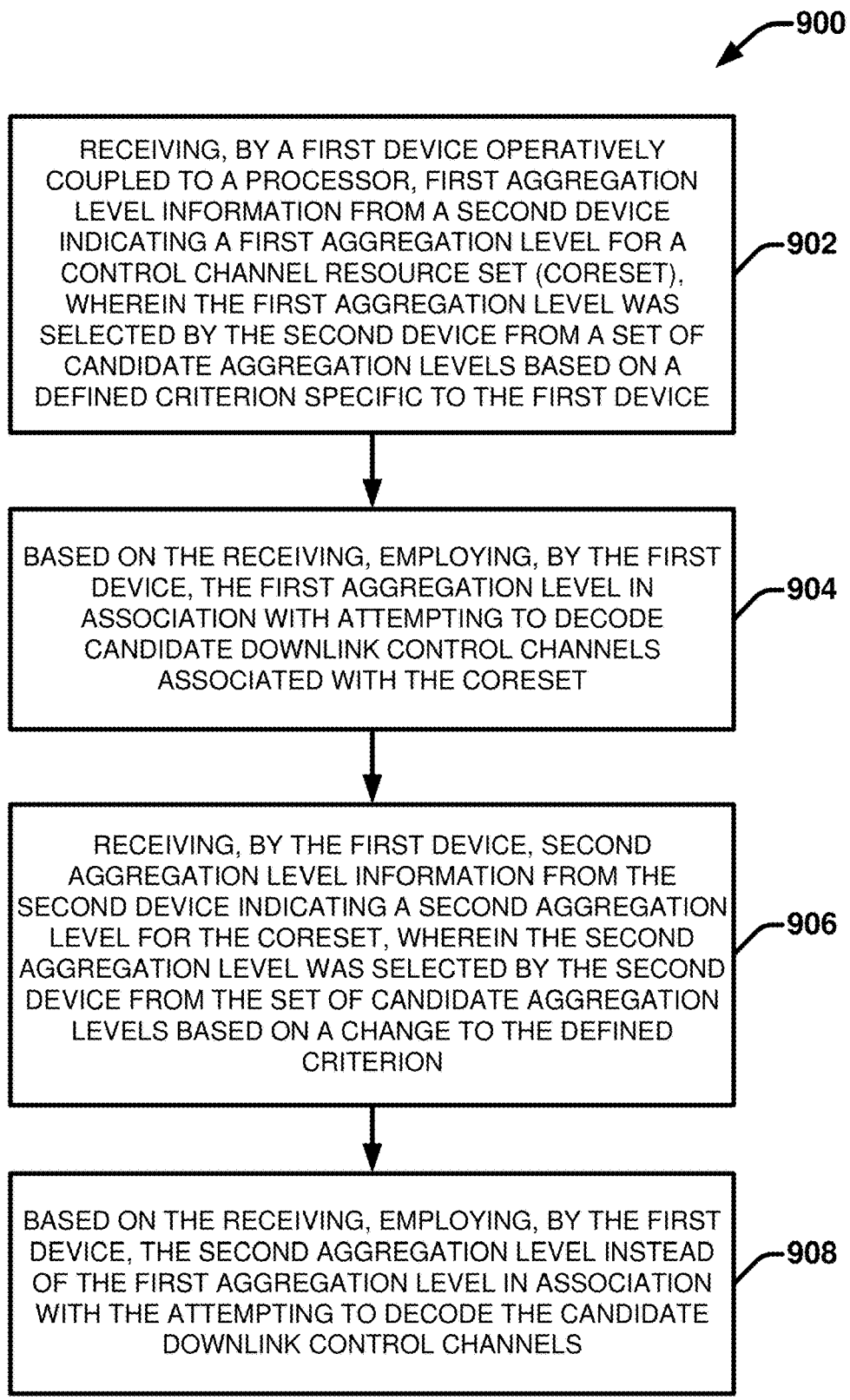
FIG. 9 presents a high-level flow diagram of another example method for receiving and applying a UE specific aggregation level for decoding candidate PDCCHs associated with a CORESET in accordance with various aspects and embodiments of the subject disclosure.

FIG. 9 presents a high-level flow diagram of another example method for receiving and applying a UE specific aggregation level for decoding candidate PDCCHs associated with a CORESET in accordance with various aspects and embodiments of the subject disclosure. Method 900 also provides an exemplary method for performance by a UE (e.g., UE 102) of a wireless communication network 100 in association communication with a network node (e.g., network node 104) servicing a cell in which the UE is located. Repetitive description of like elements employed in respective embodiments is omitted for sake of brevity.

At 902, a first device operatively coupled to a processor (e.g., UE 102), receives first aggregation level information from a second device (e.g., network node 104) indicating a first aggregation level for a CORESET, wherein the aggregation level was selected by the second device from candidate aggregation levels based on a defined criterion specific to the first device. At 904, based on the receiving, the first device employs the first aggregation level in association with attempting to decode candidate downlink control channels associated with the CORESET. At 906, the first device receives second aggregation level information from the second device indicating a second aggregation level for the CORESET, wherein the second aggregation level was selected by the second device from the candidate aggregation levels based on a change to the defined criterion. At 908, based on the receiving, the first device employs second aggregation level instead of the first aggregation level in association with the attempting to decode the candidate downlink control channels.

Figure 10:
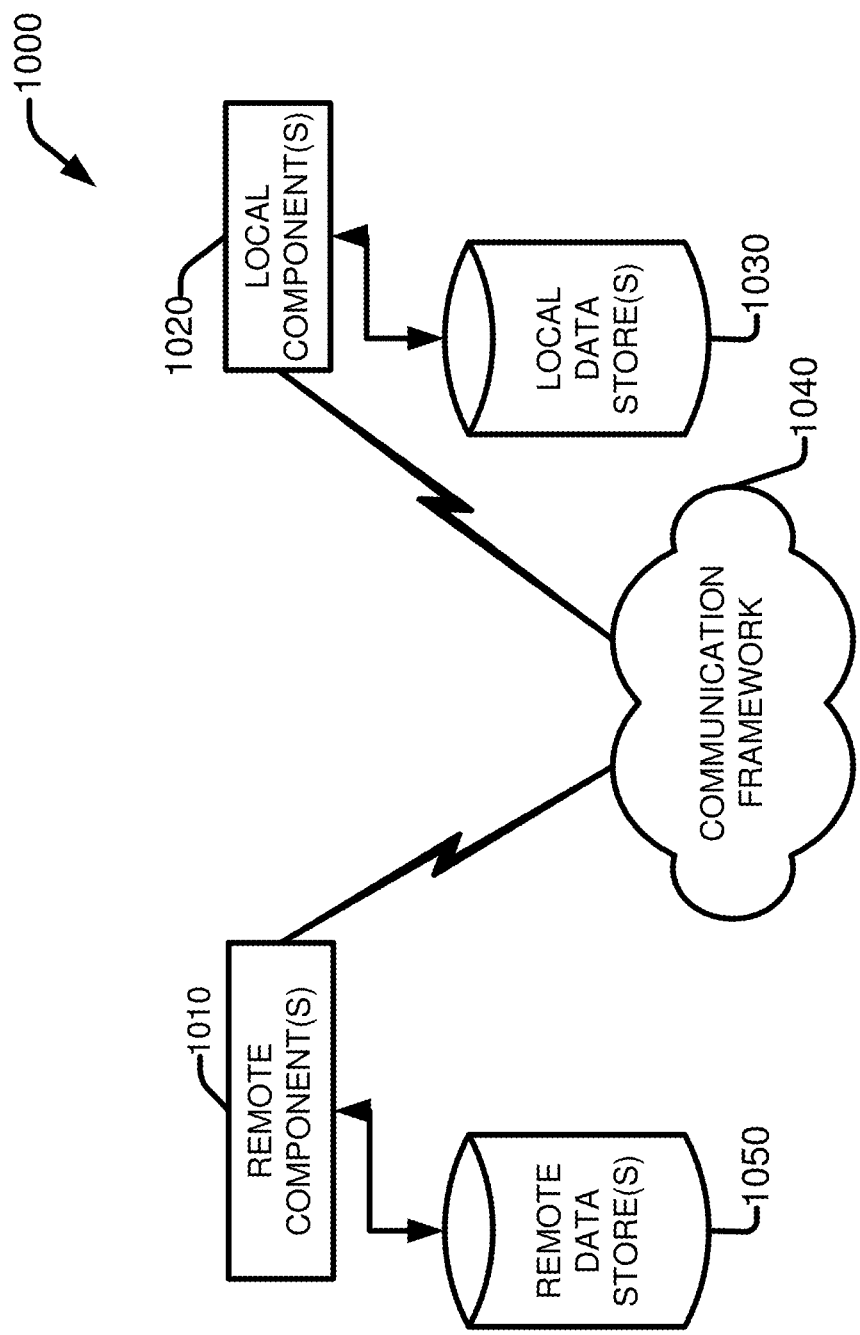
FIG. 10 depicts an example schematic block diagram of a computing environment with which the disclosed subject matter can interact.

FIG. 10 is a schematic block diagram of a computing environment 1000 with which the disclosed subject matter can interact. The system 1000 comprises one or more remote component(s) 1010. The remote component(s) 1010 can be hardware and/or software (e.g., threads, processes, computing devices). In some embodiments, remote component(s) 1010 can comprise servers, personal servers, wireless telecommunication network devices, RAN device(s), etc. As an example, remote component(s) 1010 can be network node 104, one or more devices included in the communication service provider networks 106, and the like. The system 1000 also comprises one or more local component(s) 1020. The local component(s) 1020 can be hardware and/or software (e.g., threads, processes, computing devices). In some embodiments, local component(s) 1020 can comprise, for example, a UE 102, one or more components of the UE 102, and the like etc.

One possible communication between a remote component(s) 1010 and a local component(s) 1020 can be in the form of a data packet adapted to be transmitted between two or more computer processes. Another possible communication between a remote component(s) 1010 and a local component(s) 1020 can be in the form of circuit-switched data adapted to be transmitted between two or more computer processes in radio time slots. The system 1000 comprises a communication framework 1040 that can be employed to facilitate communications between the remote component(s) 1010 and the local component(s) 1020, and can comprise an air interface, e.g., Uu interface of a UMTS network, via an LTE network, etc. Remote component(s) 1010 can be operably connected to one or more remote data store(s) 1050, such as a hard drive, solid state drive, SIM card, device memory, etc., that can be employed to store information on the remote component(s) 1010 side of communication framework 1040. Similarly, local component(s) 1020 can be operably connected to one or more local data store(s) 1030, that can be employed to store information on the local component(s) 1020 side of communication framework 1040.

Figure 11:
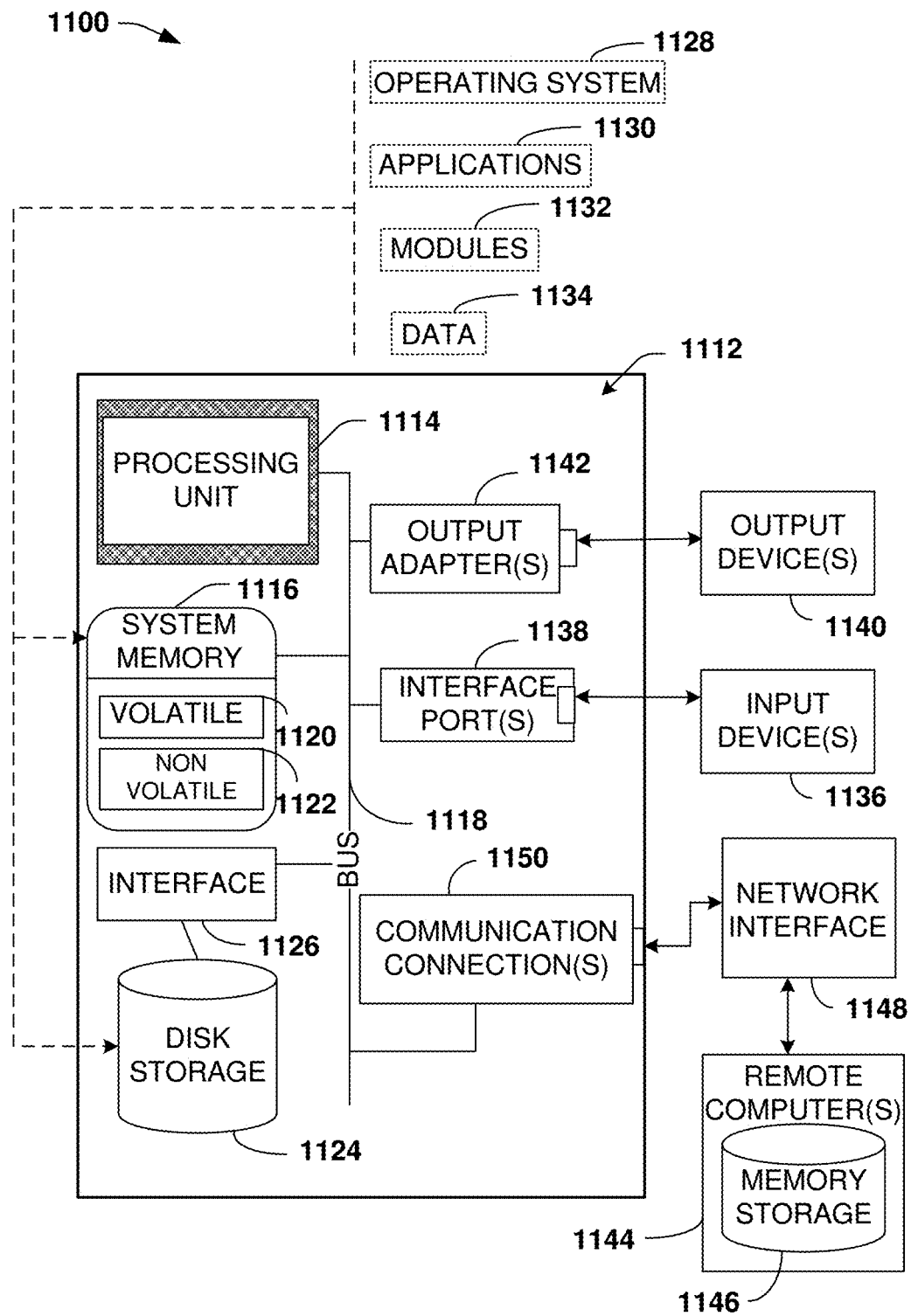
FIG. 11 illustrates an example block diagram of a computing system operable to execute the disclosed systems and methods in accordance with an embodiment.

In order to provide a context for the various aspects of the disclosed subject matter, FIG. 11, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that performs particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It is noted that the memory components described herein can be either volatile memory or nonvolatile memory, or can comprise both volatile and nonvolatile memory, by way of illustration, and not limitation, volatile memory 1120 (see below), nonvolatile memory 1122 (see below), disk storage 1124 (see below), and memory storage 1146 (see below). Further, nonvolatile memory can be included in read only memory, programmable read only memory, electrically programmable read only memory, electrically erasable read only memory, or flash memory. Volatile memory can comprise random access memory, which acts as external cache memory. By way of illustration and not limitation, random access memory is available in many forms such as synchronous random access memory, dynamic random access memory, synchronous dynamic random access memory, double data rate synchronous dynamic random access memory, enhanced synchronous dynamic random access memory, Synchlink dynamic random access memory, and direct Rambus random access memory. Additionally, the disclosed memory components of systems or methods herein are intended to comprise, without being limited to comprising, these and any other suitable types of memory.

Moreover, it is noted that the disclosed subject matter can be practiced with other computer system configurations, comprising single-processor or multiprocessor computer systems, mini-computing devices, mainframe computers, as well as personal computers, hand-held computing devices (e.g., personal digital assistant, phone, watch, tablet computers, notebook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 11 illustrates a block diagram of a computing system 1100 operable to execute the disclosed systems and methods in accordance with an embodiment. Computer 1112, which can be, for example, a UE (e.g., UE 102), a network node (e.g., network node 104), or the like, can comprise a processing unit 1114, a system memory 1116, and a system bus 1118. System bus 1118 couples system components comprising, but not limited to, system memory 1116 to processing unit 1114. Processing unit 1114 can be any of various available processors. Dual microprocessors and other multiprocessor architectures also can be employed as processing unit 1114.

System bus 1118 can be any of several types of bus structure(s) comprising a memory bus or a memory controller, a peripheral bus or an external bus, and/or a local bus using any variety of available bus architectures comprising, but not limited to, industrial standard architecture, microchannel architecture, extended industrial standard architecture, intelligent drive electronics, video electronics standards association local bus, peripheral component interconnect, card bus, universal serial bus, advanced graphics port, personal computer memory card international association bus, Firewire (Institute of Electrical and Electronics Engineers 11164), and small computer systems interface.

System memory 1116 can comprise volatile memory 1120 and nonvolatile memory 1122. A basic input/output system, containing routines to transfer information between elements within computer 1112, such as during start-up, can be stored in nonvolatile memory 1122. By way of illustration, and not limitation, nonvolatile memory 1122 can comprise read only memory, programmable read only memory, electrically programmable read only memory, electrically erasable read only memory, or flash memory. Volatile memory 1120 comprises read only memory, which acts as external cache memory. By way of illustration and not limitation, read only memory is available in many forms such as synchronous random access memory, dynamic read only memory, synchronous dynamic read only memory, double data rate synchronous dynamic read only memory, enhanced synchronous dynamic read only memory, Synchlink dynamic read only memory, Rambus direct read only memory, direct Rambus dynamic read only memory, and Rambus dynamic read only memory.

Computer 1112 can also comprise removable/non-removable, volatile/non-volatile computer storage media. FIG. 11 illustrates, for example, disk storage 1124. Disk storage 1124 comprises, but is not limited to, devices like a magnetic disk drive, floppy disk drive, tape drive, flash memory card, or memory stick. In addition, disk storage 1124 can comprise storage media separately or in combination with other storage media comprising, but not limited to, an optical disk drive such as a compact disk read only memory device, compact disk recordable drive, compact disk rewritable drive or a digital versatile disk read only memory. To facilitate connection of the disk storage devices 1124 to system bus 1118, a removable or non-removable interface is typically used, such as interface 1126.

Computing devices typically comprise a variety of media, which can comprise computer-readable storage media or communications media, which two terms are used herein differently from one another as follows.

Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, read only memory, programmable read only memory, electrically programmable read only memory, electrically erasable read only memory, flash memory or other memory technology, compact disk read only memory, digital versatile disk or other optical disk storage, magnetic cassettes, magnetic tape, magnetic disk storage or other magnetic storage devices, or other tangible media which can be used to store desired information. In this regard, the term "tangible" herein as may be applied to storage, memory or computer-readable media, is to be understood to exclude only propagating intangible signals per se as a modifier and does not relinquish coverage of all standard storage, memory or computer-readable media that are not only propagating intangible signals per se. In an aspect, tangible media can comprise non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium. As such, for example, a computer-readable medium can comprise executable instructions stored thereon that, in response to execution, cause a system comprising a processor to perform operations, comprising generating an RRC connection release message further comprising alterative band channel data.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

It can be noted that FIG. 11 describes software that acts as an intermediary between users and computer resources described in suitable operating environment 1100. Such software comprises an operating system 1128. Operating system 1128, which can be stored on disk storage 1124, acts to control and allocate resources of computer system 1112. System applications 1130 take advantage of the management of resources by operating system 1128 through program modules 1132 and program data 1134 stored either in system memory 1116 or on disk storage 1124. It is to be noted that the disclosed subject matter can be implemented with various operating systems or combinations of operating systems.

A user can enter commands or information into computer 1112 through input device(s) 1136. In some embodiments, a user interface can allow entry of user preference information, etc., and can be embodied in a touch sensitive display panel, a mouse/pointer input to a graphical user interface (GUI), a command line controlled interface, etc., allowing a user to interact with computer 1112. Input devices 1136 comprise, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1114 through system bus 1118 by way of interface port(s) 1138. Interface port(s) 1138 comprise, for example, a serial port, a parallel port, a game port, a universal serial bus, an infrared port, a Bluetooth port, an IP port, or a logical port associated with a wireless service, etc. Output device(s) 1140 use some of the same type of ports as input device(s) 1136.

Thus, for example, a universal serial bus port can be used to provide input to computer 1112 and to output information from computer 1112 to an output device 1140. Output adapter 1142 is provided to illustrate that there are some output devices 1140 like monitors, speakers, and printers, among other output devices 1140, which use special adapters. Output adapters 1142 comprise, by way of illustration and not limitation, video and sound cards that provide means of connection between output device 1140 and system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. Remote computer(s) 1144 can be a personal computer, a server, a router, a network PC, cloud storage, a cloud service, code executing in a cloud-computing environment, a workstation, a microprocessor based appliance, a peer device, or other common network node and the like, and typically comprises many or all of the elements described relative to computer 1112. A cloud computing environment, the cloud, or other similar terms can refer to computing that can share processing resources and data to one or more computer and/or other device(s) on an as needed basis to enable access to a shared pool of configurable computing resources that can be provisioned and released readily. Cloud computing and storage solutions can storing and/or processing data in third-party data centers which can leverage an economy of scale and can view accessing computing resources via a cloud service in a manner similar to a subscribing to an electric utility to access electrical energy, a telephone utility to access telephonic services, etc.

For purposes of brevity, only a memory storage device 1146 is illustrated with remote computer(s) 1144. Remote computer(s) 1144 is logically connected to computer 1112 through a network interface 1138 and then physically connected by way of communication connection 1150. Network interface 1148 encompasses wire and/or wireless communication networks such as local area networks and wide area networks. Local area network technologies comprise fiber distributed data interface, copper distributed data interface, Ethernet, Token Ring and the like. Wide area network technologies comprise, but are not limited to, point-to-point links, circuit-switching networks like integrated services digital networks and variations thereon, packet switching networks, and digital subscriber lines. As noted below, wireless technologies may be used in addition to or in place of the foregoing.

Communication connection(s) 1150 refer(s) to hardware/software employed to connect network interface 1148 to bus 1118. While communication connection 1150 is shown for illustrative clarity inside computer 1112, it can also be external to computer 1112. The hardware/software for connection to network interface 1148 can comprise, for example, internal and external technologies such as modems, comprising regular telephone grade modems, cable modems and digital subscriber line modems, integrated services digital network adapters, and Ethernet cards.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Further, the term "include" is intended to be employed as an open or inclusive term, rather than a closed or exclusive term. The term "include" can be substituted with the term "comprising" and is to be treated with similar scope, unless otherwise explicitly used otherwise. As an example, "a basket of fruit including an apple" is to be treated with the same breadth of scope as, "a basket of fruit comprising an apple."

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point," "base station," "Node B," "evolved Node B," "eNodeB," "home Node B," "home access point," and the like, are utilized interchangeably in the subject application, and refer to a wireless network component or appliance that serves and receives data, control, voice, video, sound, gaming, or substantially any data-stream or signaling-stream to and from a set of subscriber stations or provider enabled devices. Data and signaling streams can comprise packetized or frame-based flows.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. UEs do not normally connect directly to the core networks of a large service provider but can be routed to the core by way of a switch or radio access network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g. call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks comprise broadcast technologies (e.g., sub-Hertz, extremely low frequency, very low frequency, low frequency, medium frequency, high frequency, very high frequency, ultra-high frequency, super-high frequency, terahertz broadcasts, etc.); Ethernet; X.25; powerline-type networking, e.g., Powerline audio video Ethernet, etc.; femtocell technology; Wi-Fi; worldwide interoperability for microwave access; enhanced general packet radio service; third generation partnership project, long term evolution; third generation partnership project universal mobile telecommunications system; third generation partnership project 2, ultra mobile broadband; high speed packet access; high speed downlink packet access; high speed uplink packet access; enhanced data rates for global system for mobile communication evolution radio access network; universal mobile telecommunications system terrestrial radio access network; or long term evolution advanced.

The term "infer" or "inference" can generally refer to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference, for example, can be employed to identify a specific context or action, or can generate a probability distribution over states of interest based on a consideration of data and events. Inference can also refer to techniques employed for composing higher-level events from a set of events and/or data. Such inference results in the construction of new events or actions from a set of observed events and/or stored event data, whether the events, in some instances, can be correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

What has been described above includes examples of systems and methods illustrative of the disclosed subject matter. It is, of course, not possible to describe every combination of components or methods herein. One of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. Network node equipment, comprising:
a processor; and
a memory that stores executable instructions that, when executed by the processor, facilitate performance of operations, comprising:
based on a condition specific to a device, selecting one aggregation level, of aggregation levels, per control channel resource set, of control channel resource sets, the aggregation levels being configured to be applied by the device to decode respective candidate downlink control channels associated with the control channel resource sets,
wherein the aggregation levels are respectively associated with corresponding geometries,
wherein the geometries are determined as a function of signal-to-interference-plus-noise ratio (SINR) and channel quality index (CQI),
wherein the condition comprises a determination having been made that a geometry of the device is associated with the one aggregation level per control channel resource set, and
wherein the selecting the one aggregation level per control channel resource set involves an attempt to identify a type of the device and an aggregation level capability of the device that corresponds to the type of the device, involves a failure to identify the type of the device and the aggregation level capability of the device that corresponds to the type of the device, and involves a selection of a particular aggregation level as the one aggregation level per control channel resource set based on the failure to identify the type of the device and the aggregation level capability of the device that corresponds to the type of the device; and
sending aggregation level information to the device indicating the one aggregation level per control channel resource set.

2. The network node equipment of claim 1, wherein the one aggregation level per control channel resource set comprises a same aggregation level for at least two control channel resource sets of the control channel resource sets.

3. The network node equipment of claim 1, wherein the one aggregation level per control channel resource set comprises a same aggregation level for at least three control channel resource sets of the control channel resource sets.

4. The network node equipment of claim 1, wherein the one aggregation level per control channel resource set comprises different aggregation levels for at least two control channel resource sets of the control channel resource sets.

5. The network node equipment of claim 1, wherein the sending facilitates a configuration of the device by enabling application of the one aggregation level per control channel resource set to the configuration in association with the device attempting to decode candidate downlink control channels of the respective candidate downlink control channels.

6. The network node equipment of claim 1, wherein identifying the type of the device and the aggregation level capability of the device that corresponds to the type of the device involves a lookup operation for the aggregation level capability of the device using the type of the device.

7. The network node equipment of claim 6, wherein the lookup operation is performed on a network accessible database.

8. The network node equipment of claim 1, wherein the condition further comprises a current location of the device being determined to satisfy a positional relationship relative to the network node equipment.

9. The network node equipment of claim 1, wherein the aggregation levels comprise at least three aggregation levels.

10. The network node equipment of claim 1, wherein the condition further relates to a current location of the device in a cell.

11. A method, comprising:
selecting, by network equipment comprising a processor, one aggregation level per control channel resource set resulting in selected aggregation levels for respective control channel resource sets configured for application by a device to decode respective candidate downlink control channels associated with the respective control channel resource sets, comprising selecting the one aggregation level per control channel resource set based on a condition specific to the device, wherein different aggregation levels are respectively associated with corresponding geometries,
wherein the geometries are determined as a function of signal-to-interference-plus-noise ratio (SINR) and channel quality index (CQI),
wherein the condition comprises a determination having been made that a geometry of the device is associated with the one aggregation level per control channel resource set, and
wherein the selecting the one aggregation level per control channel resource set for the respective control channel resource sets involves an attempt to identify a type of the device and an aggregation level capability of the device that corresponds to the type of the device, involves a failure to identify the type of the device and the aggregation level capability of the device that corresponds to the type of the device, and involves a selection of a particular aggregation level as the one aggregation level per control channel resource set for the respective control channel resource sets based on the failure to identify the type of the device and the aggregation level capability of the device that corresponds to the type of the device; and
transmitting, by the network equipment, aggregation level information to the device indicating the selected aggregation levels for the respective control channel resource sets.

12. The method of claim 11, wherein the selecting comprises selecting a same aggregation level for at least two of the respective control channel resource sets.

13. The method of claim 11, wherein the selecting comprises selecting different aggregation levels for at least two of the respective control channel resource sets.

14. The method of claim 11, wherein the transmitting facilitates a configuration of the device by enabling the one aggregation level per control channel resource set to be applied to the configuration concurrently with the device attempting to decode candidate downlink control channels of the respective candidate downlink control channels.

15. The method of claim 11, wherein identifying the type of the device and the aggregation level capability of the device that corresponds to the type of the device involves a lookup operation for the aggregation level capability of the device using the type of the device.

16. The method of claim 15, wherein the lookup operation is performed on a network accessible database.

17. The method of claim 11, wherein the condition further relates to a determined location of the device relative to the network equipment.

18. A non-transitory machine-readable medium, comprising executable instructions that, when executed by a processor operatively coupled to a network node, facilitate performance of operations, comprising:
selecting one aggregation level per control channel resource set configured for a device based on a condition specific to the device,
wherein different aggregation levels are respectively associated with corresponding geometries,
wherein the geometries are determined as a function of signal-to-interference-plus-noise ratio (SINR) and channel quality index (CQI),
wherein the condition comprises a determination having been made that a geometry of the device is associated with the one aggregation level per control channel resource set, and
wherein the selecting the one aggregation level per control channel resource set involves an attempt to identify a type of the device and an aggregation level capability of the device that corresponds to the type of the device, involves a failure to identify the type of the device and the aggregation level capability of the device that corresponds to the type of the device, and involves a selection of a particular aggregation level as the one aggregation level per control channel resource set based on the failure to identify the type of the device and the aggregation level capability of the device that corresponds to the type of the device; and
instructing the device to employ the one aggregation level per control channel resource set to decode candidate downlink control channels.

19. The non-transitory machine-readable medium of claim 18, wherein identifying the type of the device and the aggregation level capability of the device that corresponds to the type of the device involves a lookup operation for the aggregation level capability of the device using the type of the device.

20. The non-transitory machine-readable medium of claim 18, wherein the condition further relates to a current location of the device relative to the network node.

* * * * *